(12) United States Patent
Seto et al.

(10) Patent No.: US 7,809,068 B2
(45) Date of Patent: Oct. 5, 2010

(54) INTEGRATED CIRCUIT CAPABLE OF INDEPENDENTLY OPERATING A PLURALITY OF COMMUNICATION CHANNELS

(75) Inventors: Pak-Lung Seto, Shrewsbury, MA (US); Gary Y. Tsao, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 11/319,855

(22) Filed: Dec. 28, 2005

(65) Prior Publication Data

US 2007/0147522 A1 Jun. 28, 2007

(51) Int. Cl.
*H04K 1/10* (2006.01)

(52) U.S. Cl. .......................................... 375/260; 710/50

(58) Field of Classification Search ................... 710/15, 710/52, 57; 375/260; 370/401, 466
See application file for complete search history.

(56) References Cited

U.S. PATENT DOCUMENTS

| | | | |
|---|---|---|---|
| 6,928,507 B2 * | 8/2005 | Sangveraphunski et al. . | 710/305 |
| 7,248,592 B1 * | 7/2007 | Snider ......................... | 370/401 |
| 2005/0144548 A1 | 6/2005 | Seto | |
| 2005/0223141 A1 | 10/2005 | Beckett et al. | |
| 2006/0004929 A1 * | 1/2006 | Forrer et al. .................. | 710/15 |
| 2006/0004935 A1 | 1/2006 | Seto | |
| 2006/0005061 A1 | 1/2006 | Seto | |
| 2006/0095589 A1 | 5/2006 | Seto | |
| 2006/0294269 A1 | 12/2006 | Duerk et al. | |
| 2006/0294286 A1 | 12/2006 | Duerk et al. | |
| 2007/0005810 A1 | 1/2007 | Halleck et al. | |
| 2007/0005832 A1 | 1/2007 | Chang et al. | |
| 2007/0005833 A1 | 1/2007 | Seto | |
| 2007/0005838 A1 | 1/2007 | Chang et al. | |
| 2007/0005850 A1 | 1/2007 | Chang et al. | |
| 2007/0005888 A1 | 1/2007 | Halleck et al. | |
| 2007/0005896 A1 | 1/2007 | Chang et al. | |

(Continued)

FOREIGN PATENT DOCUMENTS

| | | | |
|---|---|---|---|
| EP | 0442615 A2 | | 8/1991 |
| EP | 0442615 A2 | * | 8/1991 |
| EP | 0523878 A1 | | 1/1993 |
| EP | 0523878 A1 | * | 1/1993 |

OTHER PUBLICATIONS

Serial ATA II: Extensions to Serial ATA 1.0a Revision 1.2, Aug. 27, 2004, 110 pgs.

(Continued)

*Primary Examiner*—David C Payne
*Assistant Examiner*—Leon-Viet Q Nguyen
(74) *Attorney, Agent, or Firm*—Grossman, Tucker, Perreault & Pfleger, PLLC

(57) ABSTRACT

An apparatus according to one embodiment may include an integrated circuit. The integrated circuit may include a plurality communication channels. The integrated circuit may be is capable of communicating with at least one remote node external to the integrated circuit, via at least one of the communication channels, in accordance with at least one communication protocol. Each of said plurality of communication channels may provide a communication path between a host system and at least one remote node. The integrated circuit may be further capable of operating each communication channel independently of each other and independently of the host system. Of course, many alternatives, variations, and modifications are possible without departing from this embodiment.

17 Claims, 11 Drawing Sheets

U.S. PATENT DOCUMENTS

| | | |
|---|---|---|
| 2007/0005898 A1 | 1/2007 | Halleck et al. |
| 2007/0005903 A1 | 1/2007 | Lau et al. |
| 2007/0006235 A1 | 1/2007 | Chang et al. |
| 2007/0011333 A1 | 1/2007 | Lau et al. |
| 2007/0011360 A1 | 1/2007 | Chang et al. |
| 2007/0019636 A1 | 1/2007 | Lau et al. |
| 2007/0058279 A1 | 3/2007 | Duerk et al. |
| 2007/0067504 A1 | 3/2007 | Lau et al. |
| 2007/0073857 A1 | 3/2007 | Chang et al. |
| 2007/0073921 A1 | 3/2007 | Vemula et al. |
| 2007/0073923 A1 | 3/2007 | Vemula et al. |
| 2007/0073947 A1 | 3/2007 | Lau et al. |
| 2007/0074062 A1 | 3/2007 | Chang et al. |
| 2007/0076685 A1 | 4/2007 | Seto |
| 2007/0088860 A1* | 4/2007 | Chang et al. .......... 710/15 |
| 2007/0088895 A1 | 4/2007 | Gustafson et al. |
| 2007/0118835 A1 | 5/2007 | Halleck et al. |
| 2007/0198761 A1 | 8/2007 | Duerk et al. |

OTHER PUBLICATIONS

"PCT search report", International Search report and written opinion of the International Searching Authority, mailed: Mar. 21, 2007; PCT/US2006/047323.

Office Action received for European Patent Application No. 06845251.5 mailed on Nov. 12, 2008; 3 pages.

International Preliminary Report on Patentability for PCT Application No. PCT/US2006/047323, mailed on Jul. 10, 2008. 7 pages.

Office Action received for Chinese Patent Application No. 200680042880.2 Mailed on Jun. 5, 2009, 14 pages of Office Action and English translation of 12 pages.

Office Action received for Taiwanese Patent Application No. 95146704, mailed on Dec. 24, 2009, 10 pages of Office Action and English translation of 13 pages.

"American National Standard for Information Technology—Fibre Channel—Physical and Signalling Interface-3 (FC-PH-3)", Developed by incits, Where IT all Begins, Table of Contents, (1998), 6 pgs.

"PCI Express Base Specification Revision 1.0", PCI Express, Table of Contents, (Jul. 22, 2002), 15 pgs.

"PCI-X Addendum to the PCI Local Bus Specification", Revision 1.0a, Table of Contents, (Jul. 24, 2000), 9 pgs.

"Serial ATA: High Speed Serialized AT Attachment, Serial ATA Workgroup", Revision 1.0a, Table of Contents, APT Technologies, Inc., (Jan. 7, 2003), 10 pgs.

"Working Draft American National Standard, Project T10/1601-D", Revision 1, Table of Contents, Information Technology—Serial Attached SCSI-1.1 (SAS-1.1),(Sep. 18, 2003), 24 pgs.

* cited by examiner

INTEGRATED CIRCUIT CAPABLE OF INDEPENDENTLY OPERATING A PLURALITY OF COMMUNICATION CHANNELS

FIELD

The present disclosure relates to an integrated circuit capable of independently operating a plurality of communication channels.

BACKGROUND

In one conventional data storage arrangement, a computer node includes a host bus adapter (HBA). The HBA includes a protocol engine that communicates with a data storage system via one or more communication links in accordance with at least one communication protocol. In the conventional system, the host system may include software and/or firmware that issues one or more tasks to the HBA. Tasks may include one or more I/O data transfer commands from the host system to the data storage system, via the protocol engine. Also in the conventional system, the protocol engine is implemented, at least in large part, in software and/or firmware, and thus tasks are processed using firmware and/or software.

Processing of tasks in software and/or firmware may require at least one embedded processor to execute the instructions generated by software and/or firmware. When processing tasks using software and/or firmware, the conventional protocol engine requires multiple interrupts, which increases the overall latency of task processing and may require real time monitoring, in software and/or firmware, of the progression of the tasks through the protocol engine. In addition, if the protocol engine has multiple communication channels for processing multiple tasks issued by the host system, having one embedded processor does not allow for independent operation of the communication channels. Therefore, if the embedded processor is busy processing one task for one communication channel, processing of the remainder of tasks on the remainder of communication channels is delayed. Hence, any difficulties encountered on one communication channel adversely affect communication on the remainder of the communication channels.

Alternatively, if the software and/or firmware is embedded in the host system, these tasks may degrade the performance of the host processor and/or chipset. Thus, as protocol speed and complexity increases, software and/or firmware processing of tasks may become too slow for effective data transfer, especially when multiple tasks involving multiple data transfers via multiple communication channels and associated ports may be issued by the host system.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
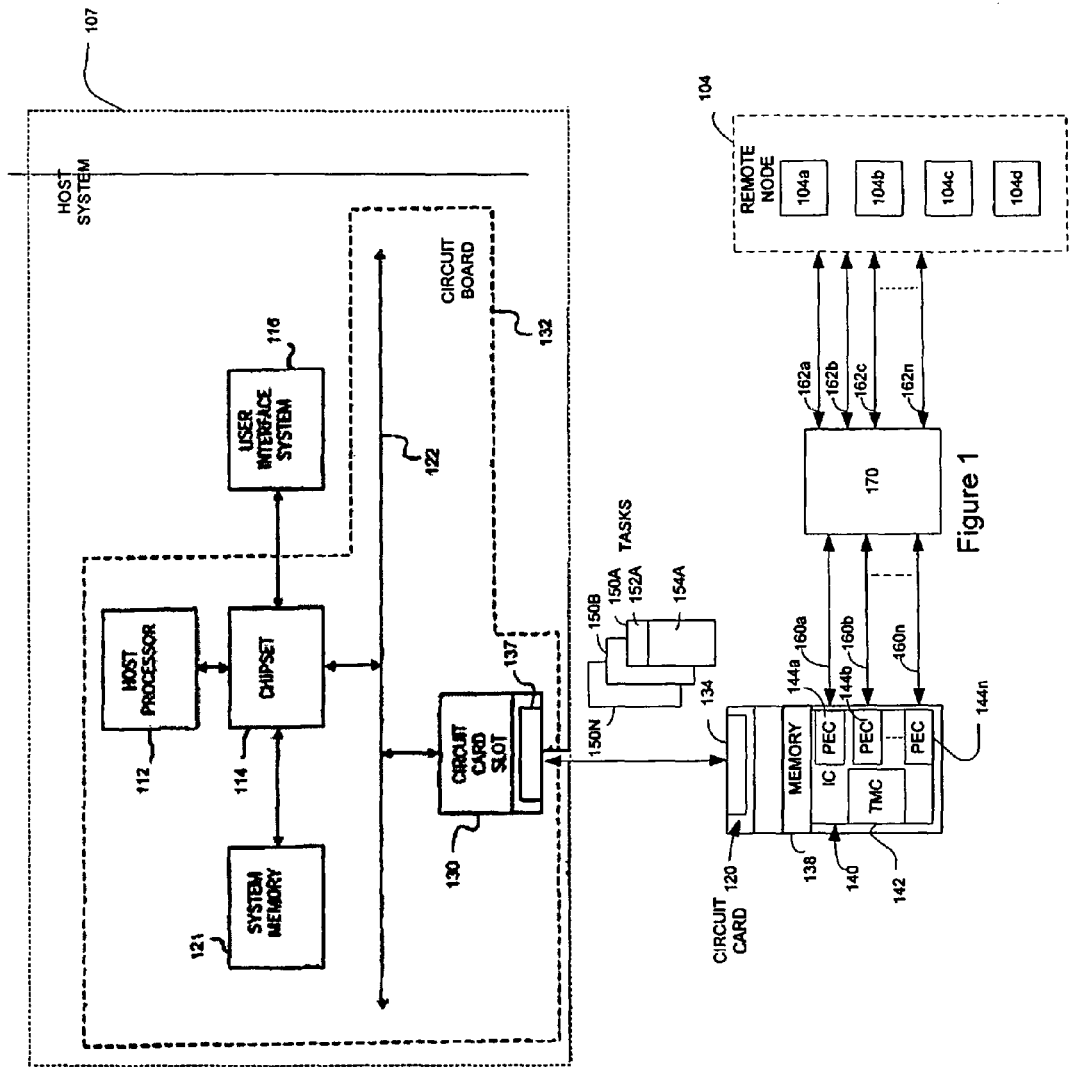
FIG. 1 is a diagram illustrating a system embodiment.

FIG. 1 illustrates a system embodiment 100 of the claimed subject matter. The system 100 may generally include a host system 107, a circuit card 120, and at least one remote node 104. The host system 107 may include a host processor 112, a bus 122, a user interface system 116, a chipset 114, system memory 121, and a circuit card slot 130. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the Assignee of the subject application (e.g., graphics memory and I/O controller hub chipsets), although other integrated circuit chips may also, or alternatively be used. The processor 112, system memory 121, chipset 114 and circuit card slot 130 may be integrated onto a circuit board 132, e.g., a system motherboard.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the circuit card 120 becomes electrically coupled to bus 122 and may exchange data and/or commands with system memory 121, host processor 112, and/or user interface system 116 via bus 122 and chipset 114.

Circuit card 120 may comprise a host bus adaptor (HBA) which may comprise at least one integrated circuit 140 capable of initiating communication between the host system 107 and at least one remote node 104. The circuit card 120 may communicate with one or more remote nodes, via at least one communication link, for example 160*a*, 160*b*, . . . , 160*n*, using a plurality of communication protocols. In one embodiment, remote node 170 may comprise an expander. In turn, expander 170 may connect one or more links 160*a*, 160*b*, . . . , 160*n* with remote node 104, via one or more additional links 162*a*, 162*b*, 162*c*, . . . 162*n*. Of course, circuit card 120 may be coupled directly to remote node 104 (i.e., without expander 170), via links 160*a*, 160*b*, . . . , 160*n* without departing from this embodiment. Also, one or more of links 160*a*, 160*b*, . . . , 160*n* may be coupled to other remote nodes (not shown) without departing from this embodiment.

Remote node 104 may comprise, for example, a mass storage array that includes a plurality of mass storage devices (e.g., hard disk drives) 104*a*, 104*b*, 104*c* and 104*d*. Alternatively or additionally, a remote node may include an expander device, a bridge, another host system, and/or other intermediate device, and/or other device external to circuit card 120, without departing from this embodiment. In at least one embodiment, the mass storage array may comprise, e.g., one or more redundant arrays of independent disks (RAID). The RAID level that may be implemented may be RAID level 0, 1, or greater than 1. Alternatively or additionally, one or more mass storage devices may comprise a solid state storage device, e.g., flash memory drive, static random access memory (SRAM) drive, etc.

The integrated circuit 140 may include circuitry that is capable of initiating communication between the host system 107 and the remote node 104 to exchange data and/or commands there between. "Integrated circuit", as used in any embodiment herein, may be defined as a semiconductor device or microelectronic device such as, for example, a semiconductor integrated circuit chip. Also, as used in any embodiment herein, "circuit" and "circuitry" may comprise, for example, singly or in any combination, hardwired circuitry, programmable circuitry, state machine circuitry, and/or firmware that stores instructions executed by programmable circuitry. Also, in any embodiment herein, circuitry may be embodied as, and/or form part of, one or more integrated circuits.

The circuit card 120 may also comprise memory 138. Memory 138 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 138 may comprise other and/or later-developed types of computer-readable memory. Machine-readable firmware program instructions may be stored in memory 138. These instructions may be accessed and executed by integrated circuit 140. When executed by integrated circuit 140, these instructions may result in integrated circuit 140 performing the operations described herein as being performed by integrated circuit 140. Additionally, and as will be described in more detailed below, memory 138 and/or other memory (not shown) may be capable of storing data which may be associated with the operation of integrated circuit 140.

Alternatively, without departing from this embodiment, the operative circuitry of the circuit card 120 may be included in other structures, systems, and/or devices. These other structures, systems, and/or devices may be, for example, comprised in the motherboard 132, coupled to the bus 122, of the host system 107. Thus, for example, the operative circuitry described herein associated with integrated circuit 140 may be comprised in chipset 114. Alternatively, the operative circuitry described herein associated with integrated circuit 140 may be comprised in a storage array of the remote node 104. Of course, the operative circuitry described herein associated with integrated circuit 140 may be comprised in more than one integrated circuit, without departing from this embodiment.

Host system 107 may be capable of generating one or more tasks 150A, 150B . . . 150N and transferring the tasks to the IC 140 (of the circuit card 120) for execution. A task 150A, 150B . . . or 150N may include, for example, data transfer, control, and/or management instructions generated by the host system 107. For example, a task 150A, 150B . . . or 150N may comprise one or more I/O instructions to read data from, and/or write date to, one or more devices in remote node 104. To that end, host system 107 may be configured with software and/or a driver (which may be executed, for example, on host processor 112) configured to generate one or more tasks.

A task, for example, task 150A, may include task instructions 152A and context information 154A. Task instructions may comprise instructions associated with a given task, for example, instructions to initiate communication with one or more remote nodes for an I/O transaction (e.g., a data transfer task), a primitive sequence task (i.e., instructions for integrated circuit to generate one or more primitive signal sequences, as may be required by a communication protocol), a manual frame task, etc.

Context information 154A may include, for example, Scheduling Context Information (which may include, for example, local port number, remote node number, priority information, etc.), Task Context (which may include, for example, a transfer size for an I/O operation, data buffer pointers, protocol type, etc.), and/or Remote Node Context (which may include, for example, remote node port address, communication protocols supported by the remote node, remote node port width, queue depth for the remote node per port, connection rate information, etc.)

The integrated circuit 140 may include a plurality of communication channels. Each channel may be defined by respective protocol engine circuitry 144*a*, 144*b*, . . . , 144*n* (abbreviated PEC in FIG. 1). Integrated circuit 140 may also include task management circuitry 142 (abbreviated TMC in FIG. 1). Each channel, defined by respective protocol engine circuitry 144*a*, 144*b*, . . . , 144*n* may be capable of communicating with at least one remote node 104 in accordance with at least one of a plurality of communication protocols. For example, if a Fibre Channel (FC) protocol is used by protocol engine circuitry 144 to exchange data and/or commands with remote node 104, it may comply or be compatible with the interface/protocol described in "ANSI Standard Fibre Channel Physical and Signaling Interface-3 X3.303:1998 Specification." Alternatively or additionally, if a Serial ATA (SATA) protocol is used by protocol engine circuitry 144 to exchange data and/or commands with remote node 104, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group and/or earlier and/or later published versions of the SATA standard.

Further alternatively or additionally, if a Serial Attached Small Computer System Interface (SAS) protocol is used by protocol engine circuitry 144 to exchange data and/or commands with remote node 104, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. The SAS communication protocol may include one or more communication transport protocols, for example, Serial Advanced Technology Attachment (ATA) Tunneled Protocol (STP) and Serial Small Computer System Interface (SCSI) Protocol (SSP). Of course, protocol engine circuitry 144 may be capable of communicating using other communication protocols, without departing from this embodiment.

In this embodiment, each communication channel 144a, 144b, . . . ,144n may be a virtual and/or physical link between two points. Thus, for example, each communication channel 144a, 144b, . . . ,144n may provide a communication path between the host system 107 and one or more remote nodes (e.g., remote node 170 and/or 104). As will be described in greater detail below, each communication channel may include a port (to which, for example, one or more links 160a, 160b, . . . ,160n may be coupled). Depending on a given communication protocol, a port may include a plurality of links (wide port) or a single link (narrow port). For example, in the SAS communication protocol, a plurality of links may be assigned to a port, thus defining a wide port. In at least one embodiment described herein, each communication channel 144a,144b, . . . ,144n may operate independently of each other and independently of said host system 107. Thus, a failure and/or error condition one or more of the communication channels may not degrade performance in the other channels. Additionally, by operating independently of the host system 107, each communication channel may be capable of enhanced data transfer capabilities.

The task management circuitry 142 may be capable of receiving one or more tasks 150A, 150B . . . 150N from host system 107. The task management circuitry 142 may be capable of performing a variety of task independently of the host system 107. For instance, the task management circuitry 142 may be capable queuing a plurality of tasks, discovering the appropriate protocol engine circuit 144a, 144b, . . . ,144n to process a given task, and forwarding one or more tasks to one or more protocol engine circuits 144a, 144b, . . . ,144n. Task management circuitry 142 may schedule a plurality of tasks for execution, select a task, among a plurality of scheduled tasks, for execution, and, upon execution of the task by the protocol engine circuitry 144, report the status of the task to the software/driver being executed on host system 107.

Protocol engine circuitry 144 may be capable of executing one or more tasks scheduled by the task management circuitry 142 and communicating the status of the task to the task management circuitry 142. Thus, in at least one embodiment described herein, integrated circuit 140 may be capable of scheduling a plurality of tasks, selecting at least one task for execution, executing a task, and reporting the status of the selected task independently of software/driver on host system 107. In at least one embodiment, task management circuitry 142 and protocol engine circuitry 144 may be implemented in one or more dedicated hardware circuits and/or state machine circuits configured to perform operations as stated herein.

When integrated circuit 140 receives a task from host system 107 to transmit data to, or receive data from, remote node 104, task management circuitry 142 and protocol engine circuitry 144 may reside along the a plurality of communication channels between host system 107 and remote node 104. Thus, implementation of task management circuitry 142 and protocol engine circuitry 144 in dedicated hardware circuits and/or state machine circuits may offer enhanced data transmission capabilities, and thus increased performance, as opposed to software and/or firmware implementations since the host processor 112 or an embedded processor is not involved in executing instructions. Of course, it is equally contemplated herein to implement task management circuitry 142 and/or protocol engine circuitry 144 and/or a portion thereof in software and/or firmware, without departing from this embodiment. The operation of task management circuitry 142 and protocol engine circuitry 144 are described in greater detail below.

Figure 2:
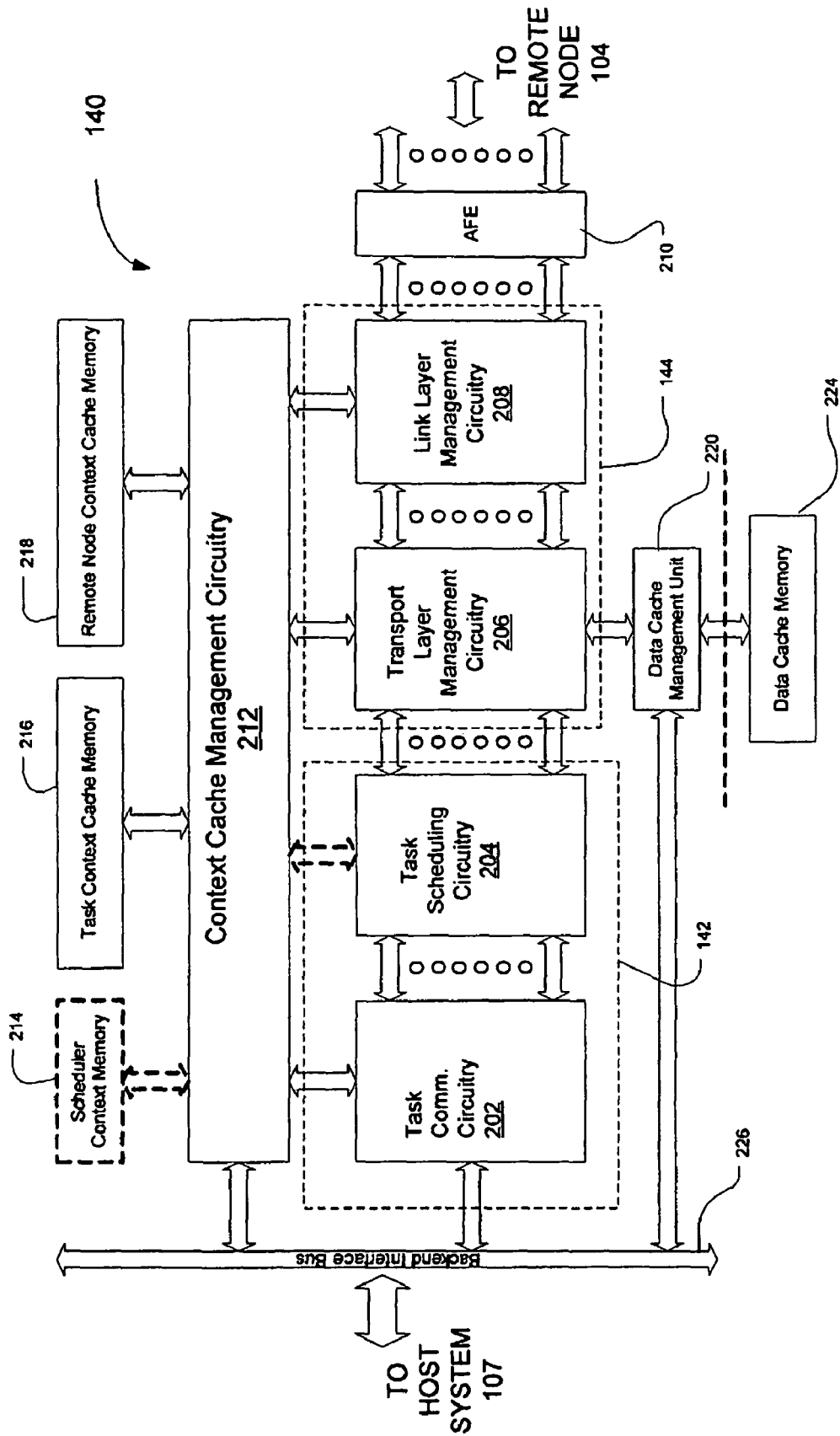
FIG. 2 is a diagram illustrating in greater detail the integrated circuit of FIG. 1.

FIG. 2 is diagram 200 illustrating in more detail the integrated circuit 140 of the embodiment of FIG. 1. In FIG. 2, certain portions of the system 100 depicted in FIG. 1 have been omitted for clarity (for example circuit board 132, circuit card 120 and remote node 104), but it is to be understood that like parts of FIG. 2 can be implemented in a manner consistent with an embodiment depicted in FIG. 1, or alternatively in other system implementations, without departing from this embodiment. For example, integrated circuit 140 depicted in FIG. 2 may comprise an integrated system on chip (SoC) and/or RAID on chip (ROC) and/or protocol bridge and/or external storage controller, each of which may comprise elements referred to in FIG. 1, and/or other and/or additional elements, for example, as may be used in other system embodiments.

In this embodiment, task management circuitry 142 may include task communication circuitry 202 and task scheduler circuitry 204. In this embodiment, protocol engine circuitry is depicted generally by reference numeral 144, and may comprise transport layer management circuitry 206 and link layer management circuitry 208. In one embodiment, each communication channel may be defined by a transport layer/link layer pair. Integrated circuit 140 may also include analog front end (AFE) circuitry 210, context cache management circuitry 212 and data cache management circuitry 220. In one embodiment, integrated circuit 140 may also include context cache management circuitry 212, scheduler context memory 214, task context cache memory 216, and remote node context cache memory 218.

Task communication circuitry 202 may be coupled to a backend interface bus 226. In general, the task communication circuitry 202 may operate as a communication interface between the software/driver of the host system 107 and the remainder of the integrated circuit 140. The task communication circuitry 202 may receive tasks from the host system 107 and post task status to the software/driver of the host system 107. The task communication circuitry 202 may communicate with the context cache management circuitry 212 which in turn may store context information from various tasks in different memory locales such as the scheduler context memory 214, the task context cache memory 216, and the remote node context cache memory 218.

Task communication circuitry 202 may utilize a local and/or remote task work queue and a local and/or remote status queue. The task work queue may store task instructions from a plurality of tasks sent by the host system 107. In essence, the task work queue provides a memory location for one or more tasks awaiting processing by the protocol engine circuitry 144. The status queue may store data associated with the status of a particular task. Thus, for example, the status of a task (e.g., completion, work-in-progress and/or failure of a task) may be stored in the status queue, and the status may then be reported to the host system 107. The task communication circuitry 202 may operate in a master mode or in a slave mode. A main difference between the master mode and slave mode is where the task work queue and the status queue are located.

Figure 3:
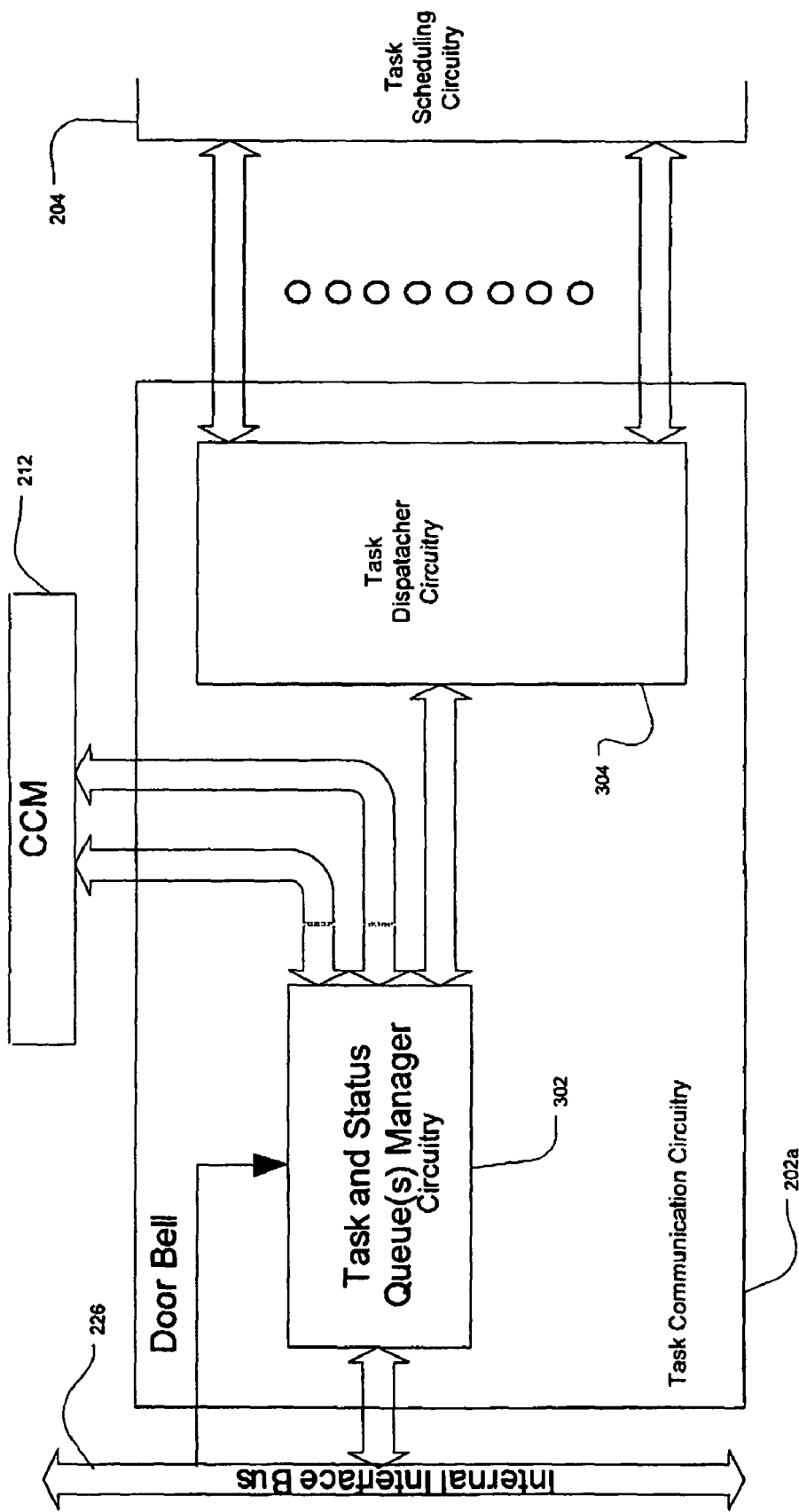
FIG. 3 is a diagram illustrating in greater detail one exemplary embodiment of task communication circuitry of the task management circuitry of the integrated circuit of FIG. 2.

FIG. 3 illustrates a master mode embodiment of the task communication circuitry 202 of FIG. 2. In the master node, the task work queue and the status queue may be stored external to the task communication circuitry 202a and the protocol engine circuitry 144. The task communication circuitry 202a of FIG. 3 may include task and status queue(s) manager circuitry 302 and task dispatcher circuitry 304. The task and status queue(s) manager circuitry 302 may manage the task work queue and the status queue to fetch task information from the task work queue and report status to the status work queue. The master mode task communication circuitry 202a may be duplicated for each communication channel, e.g., in one embodiment there may be eight task communication circuitries 202a for eight communication channels associated with eight external ports.

The task dispatcher circuitry 304 may route task(s) to an appropriate local port of the task scheduling circuitry 204. Therefore, the firmware/driver of the host system 107 needs only to generate a task to the task work queue or retrieve status information from the status work queue for the same function regardless of how many or which local ports are assigned to that function or virtually mapped to that function. The task dispatcher circuitry 304 may route task(s) to appropriate local ports based on a local port number given by firmware when it issues the task. The task dispatcher circuitry 304 may also parse the context information of a task given to or fetched by the task communication circuitry 202 to appropriate context memory, e.g., scheduler context to scheduler context memory 214, task context to task context memory 216, and remote node context to remote node context memory 218 based on either the a task context index or a remote node index. The context buffer management for the three context memories 214, 216, and 218 may be managed by the context cache management circuitry 212.

Since the task work queue and the status queue may be located external to the protocol engine circuitry 144 in the master mode embodiment, the protocol engine circuitry 144 may monitor the status of both queues and may be notified by the software/driver of the host system 107 to fetch tasks assigned by the host system 107 from the task work queue and to send task completion status information or protocol engine status information to the status queue. The locations of the task work status and the status queue may be initialized by firmware/driver of the host system 107. If the firmware/driver of the host system 107 posts one or more tasks in the external task work queue it may provide a "doorbell" signal to the task and status queue(s) manager circuitry 302 informing it of this situation to start the scheduling and processing of that task.

Figure 4:
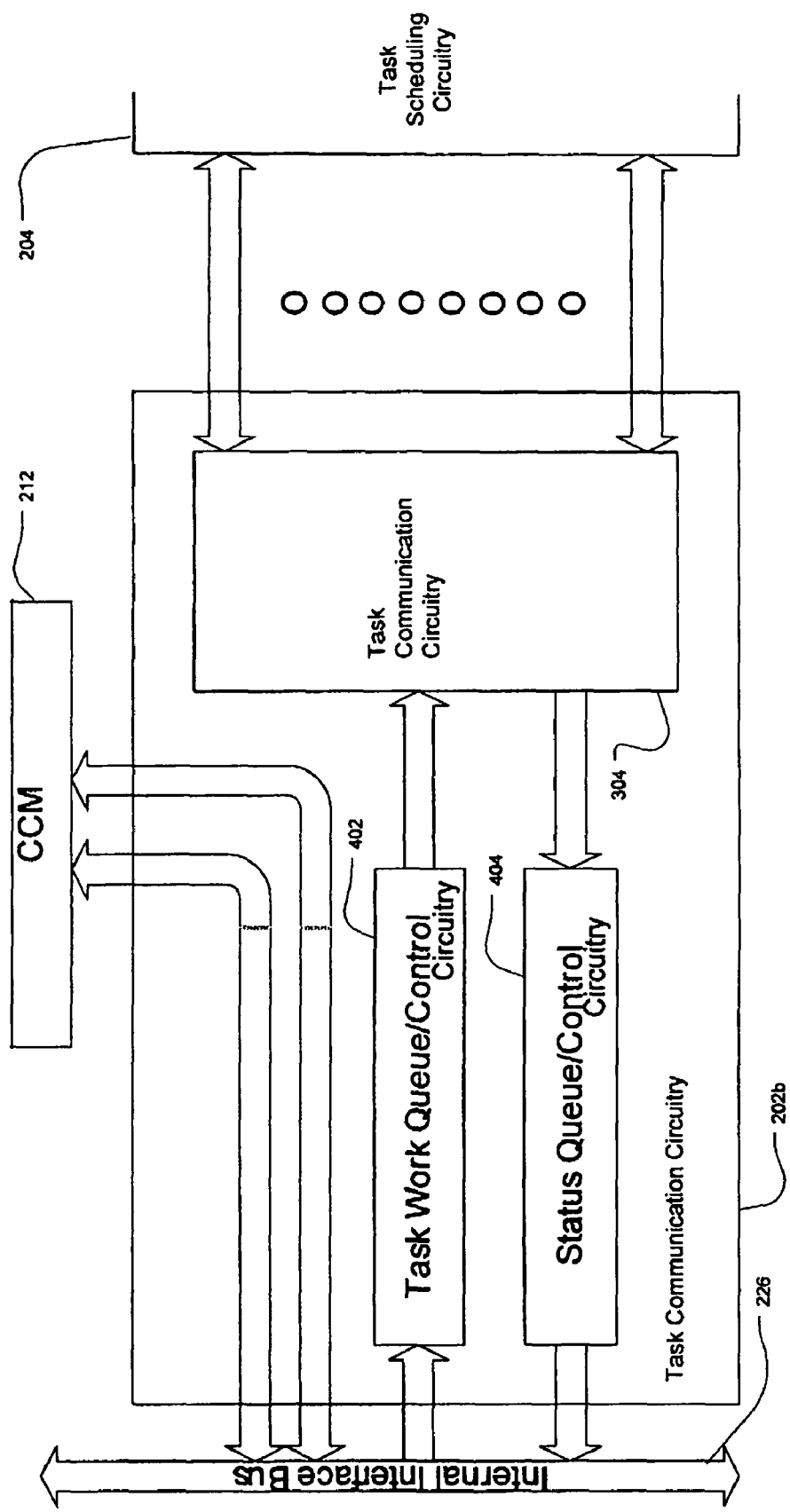
FIG. 4 is a diagram illustrating in greater detail another exemplary embodiment of task communication circuitry of the task management circuitry in the integrated circuit of FIG. 2.

FIG. 4 illustrates a slave mode embodiment of the task communication circuitry 202 of FIG. 2. In the slave mode, the task work queue/control circuitry 402 as well as the status queue/control circuitry 404 may be local to the task communication circuitry 202b. The slave mode embodiment of the task communication circuitry 202b may also include task dispatcher circuitry 304 similar to that of the master mode embodiment of FIG. 3 and hence any repetitive description is omitted herein for clarity.

In the slave mode embodiment, the firmware/driver of the host system 107 may assign tasks to the local task work queue 402 and retrieve status information from the local status queue 404. As opposed to the master mode, the firmware/driver of the host system 107 is responsible to monitor the status queue in the slave mode. A master or slave mode embodiment may be chosen in response to specific implementation and usage model requirements.

Figure 5:
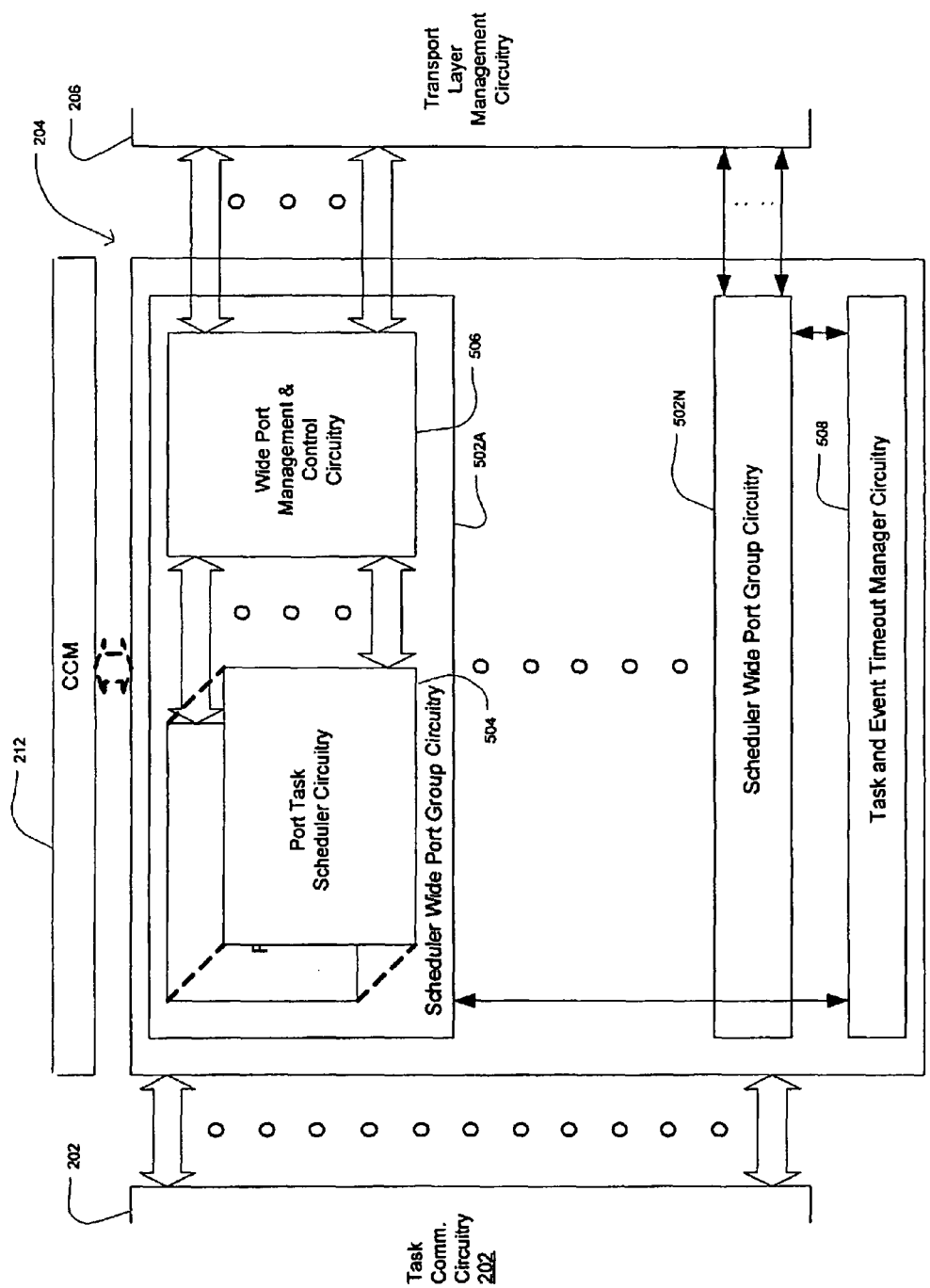
FIG. 5 is a diagram illustrating in greater detail task scheduler circuitry of the task management circuitry in the integrated circuit of FIG. 2.

FIG. 5 illustrates in greater detail an embodiment of the task scheduling circuitry 204 of FIG. 2. In general, the task scheduling circuitry 204 finds a task that needs to be executed and assigns the task to an available task execution resource of the protocol engine circuitry 144. The task scheduling circuitry 204 may include a plurality of scheduler wide port groups 502A . . . 502N. Each scheduler wide port group circuitry, e.g., scheduler wide port group 502A circuitry, may include port task scheduler circuitry 504 and wide port management and control circuitry 506. The port task scheduler circuitry 504 may perform all the scheduling and assign tasks to the applicable resource of the protocol engine circuitry 144. The wide port management and control circuitry 506 may connect all available links to a local port. The task and event timeout manager circuitry 508 may monitor all tasks active on one or more port task scheduler circuitries as well as all tasks with inbound status. The task and event timeout manager circuitry 508 may also monitor all timeout events generated by the transport layer management circuitry 206 or the link layer management circuitry 208.

Figure 6:
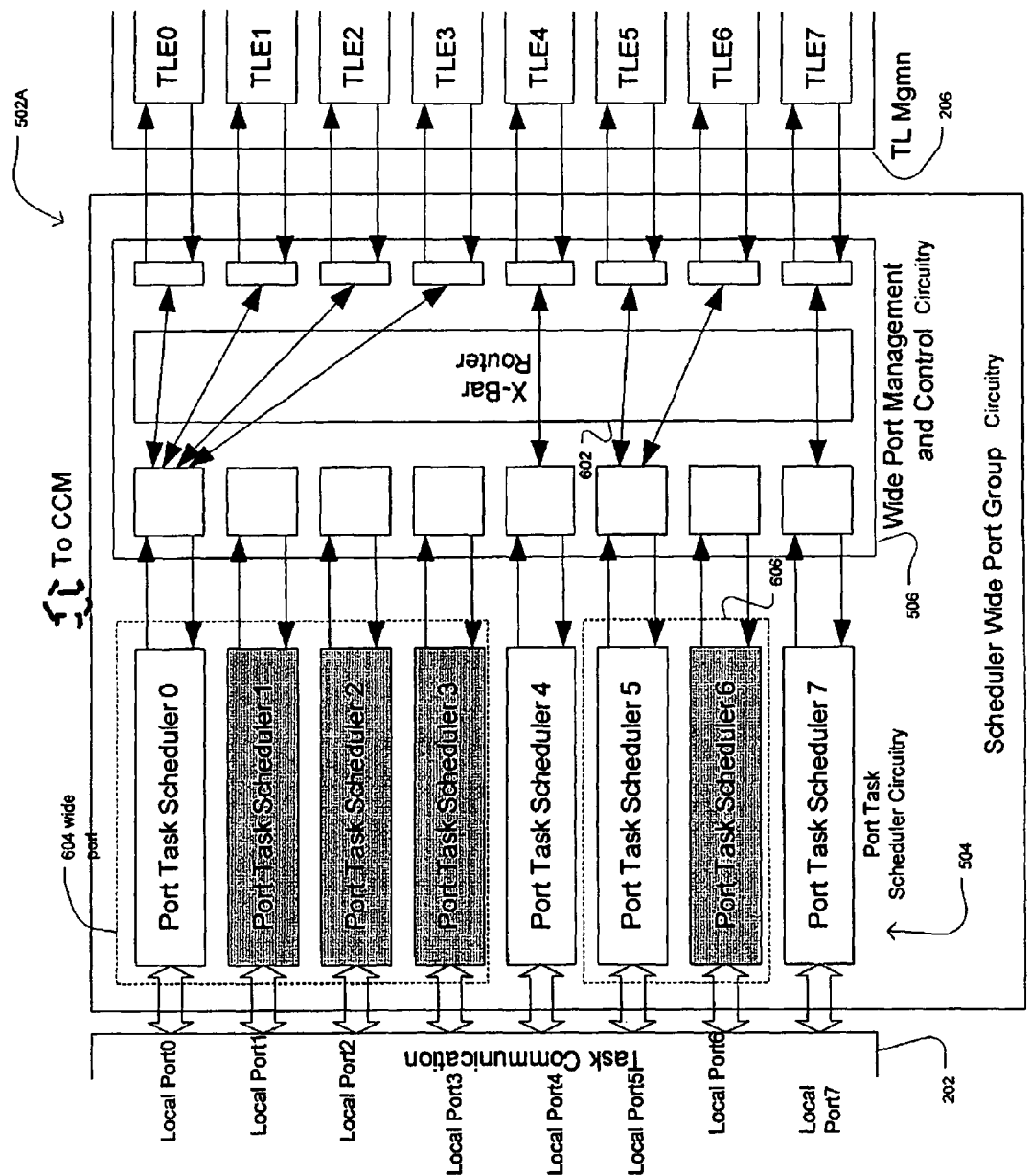
FIG. 6 is a diagram illustrating in greater detail wide port circuitry of the task scheduler circuitry of the task management circuitry in the integrated circuit of FIG. 2.

FIG. 6 illustrates the scheduler wide port group circuitry 502A of FIG. 5 in more detail. The port task scheduler circuitry 504 may include one port task scheduler circuitry per channel or link associated with a local port. For example, port task scheduler circuitry 0 may be associated with local Port 0 via an associated channel, port task scheduler circuitry 1 may be associated with local Port1 via an associated channel, etc. If the particular communication protocol being utilized supports a wide port function, e.g., the SAS communication protocol, multiple channels may form a wide port such as wide ports 604 and 606. A wide port may only require one of the ports task scheduler circuitries and the unused port task scheduler circuitries may be disabled. For instance, wide port 604 may utilize "Port Task Scheduler 0" and may disable the "Port Task Scheduler 1," "Port Task Scheduler 2," and "Port Task Scheduler 3." The unused port task scheduler circuitries may be disabled by firmware of the host system 107 during port configuration.

Each port task scheduler circuitry may schedule all tasks for each remote node for later transmission to the remote node. Each port task scheduler circuitry may not be required to schedule tasks that are in a "frame reception state" for receipt from the remote node. Therefore, if the remote node has no active tasks or is offline, the port task scheduler circuitry may temporarily remove that particular remote node from the task scheduler circuitry to improve scheduling.

Each port task scheduler circuitry may function as a horizontal scheduler, a vertical scheduler, or a local port manager. A horizontal scheduler may select which remote node needs to be serviced next and may remember which remote nodes have a current active connection. The horizontal scheduler may also maintain the connection retry state of a remote node that has failed connection attempts and manage connection timeout failing management. The horizontal scheduler may also support one or more remote nodes within a connection if the associated communication protocol supports such a configuration, e.g., SATA Port Multiplier, FL_Port in FC fabric, etc.

Each port task scheduler circuitry may also function as a vertical scheduler. The vertical scheduler may mange tasks that are active for all remote nodes that can be accessed from the associated local port. For example, the vertical scheduler may insert a new task into a task list of an associated remote node. The vertical scheduler may also maintain the active task count and manage the queue depth for each remote node. The vertical scheduler may also manage the order of task execution within any remote task lists. The vertical scheduler may also maintain multiple task lists within a remote node, e.g., an operation mode task list, communication protocol specific task lists, and priority (high, low) task lists. The vertical scheduler may also re-schedule any uncompleted tasks. In response to the type of the uncompleted task, the vertical scheduler may place it at the beginning or end of a particular task list.

Each port task scheduler circuitry may also function as a local port manager. The local port manager may manage port configuration and status, e.g., link to port assignments, the number of allowable connections, connection scheduling fairness, etc. The local port manager may also perform queue depth management and interact with the link layer management circuitry 208 for connection management.

The wide port management and control circuitry 506 may include an X-bar router 602 that includes X-bar routing logic.

The X-bar routing logic may be configured by the firmware/driver of the host system 107 while it initializes the protocol engine circuitry 144 and configures any hardware port mapping. The firmware may also map/route the transport layer management circuitry 206/link layer management circuitry 208 to an associated port task scheduler after a wide port configuration protocol has been completed, e.g., an exchange of identity frames in the SAS communication protocol. Again, any unused port task scheduler circuitry may be disabled.

Figure 7:
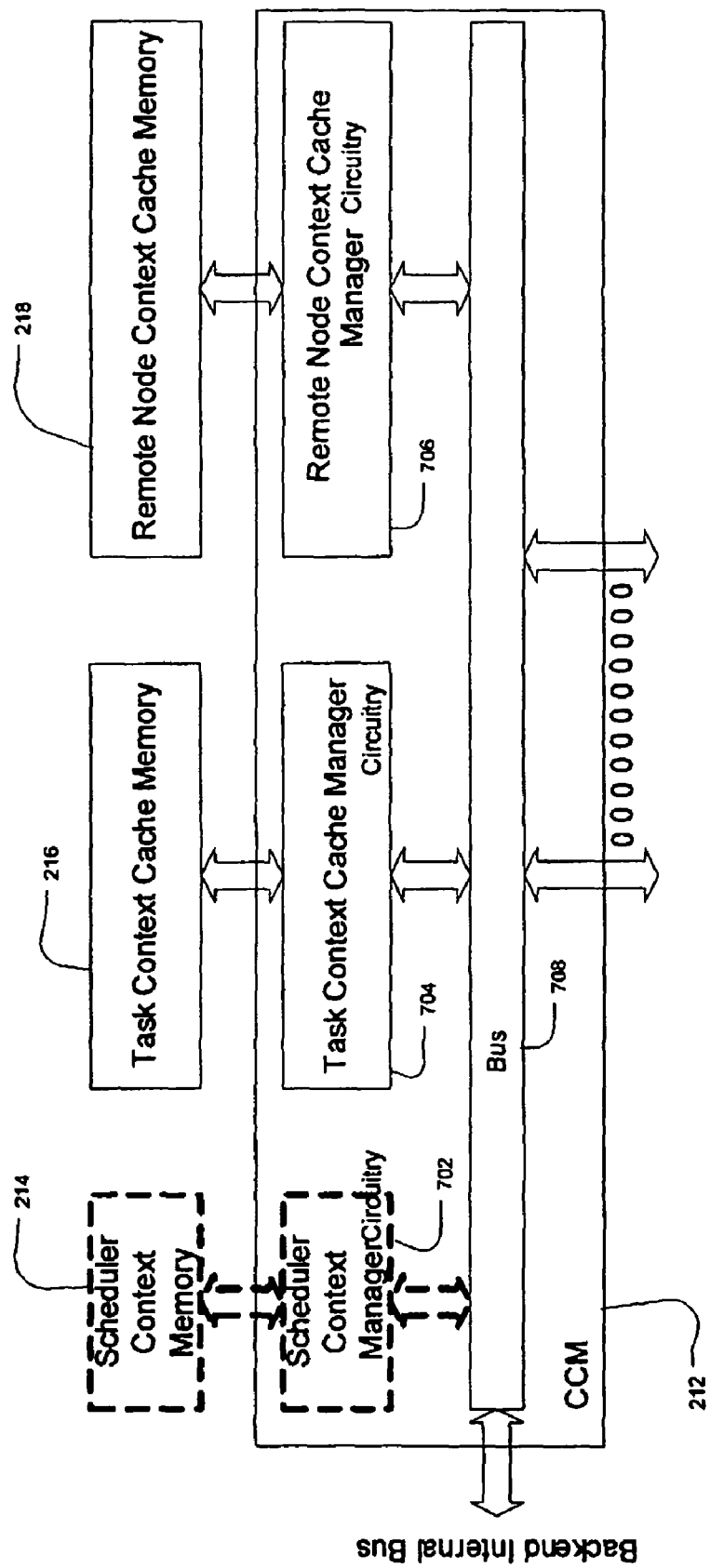
FIG. 7 is a diagram illustrating in greater detail context cache management circuitry in the integrated circuit of FIG. 2.

FIG. 7 illustrates in greater detail context cache management circuitry 212 of the integrated circuit 140 of FIG. 2. In general, the context cache management circuitry 212 may store context to and provide context from the scheduler context memory 214, the task context cache memory 216, and the remote node context cache memory 218. The context cache management circuitry 212 may provide context to the task scheduling circuitry 204, the transport layer management circuitry 206, and the link layer management circuitry 208 when needed. The context cache management circuitry 212 may cache and pre-fetch context from external memory to be ready for use by the task scheduling circuitry 204, the transport layer management circuitry 206, and the link layer management circuitry 208. The context cache management circuitry 212 may also perform context lock, context unlock, pre-fetch, and schedule context to be used. The context cache management circuitry 212 may also perform task context index to cached context address mapping/translation. The size of each context memory 214, 216, and 218 may vary depending on the implementation.

The context cache management circuitry 212 may include an internal bus 708 coupled to task context cache manager circuitry 704, remote node context cache manager circuitry 706, and scheduler context manager circuitry 702. The task context cache manager circuitry 704 may manage task context caching and make requested task context available to the transport layer management circuitry 206. The remote node context cache manager circuitry 706 may manage remote node context caching and make requested remote node context available to the link layer management circuitry 208. The scheduler context manager circuitry 702 is illustrated in phantom since it may also be located within the task scheduling circuitry 204. The scheduler context manager circuitry 702 may supply the next task context to the transport layer management circuitry 206 with an active connection and the next selected remote node to be served.

Figure 8:
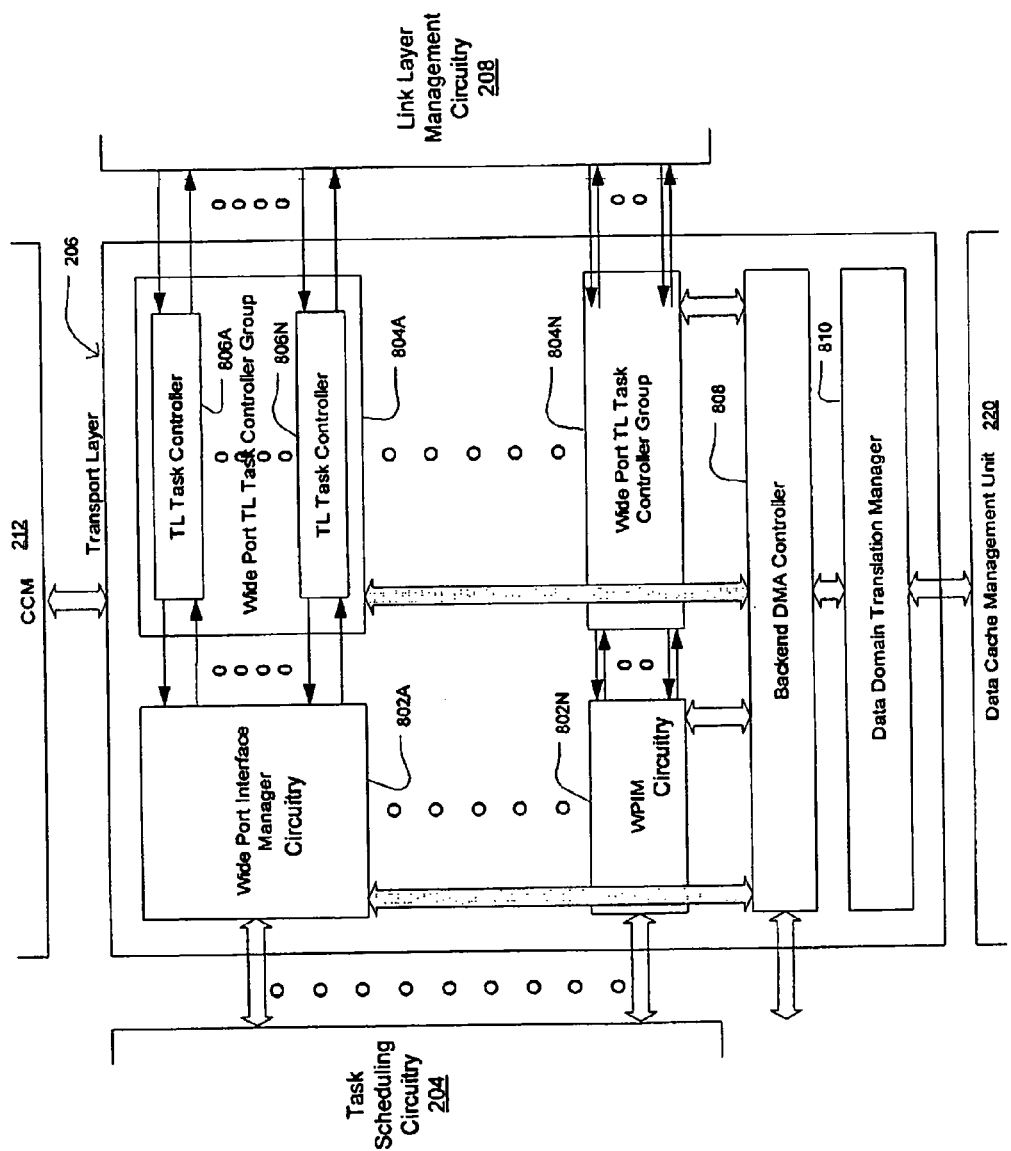
FIG. 8 is a diagram illustrating in greater detail transport layer management circuitry of the protocol engine circuitry in the integrated circuit of FIG. 2.

FIG. 8 illustrates in greater detail transport layer management circuitry 206 of the protocol engine circuitry in the integrated circuit of FIG. 2. In general, the transport layer management circuitry 206 may execute tasks assigned by the task scheduling circuitry 204. The transport layer management circuitry 206 may segment or break down a task into a plurality of control and/or data outbound frames or packets in accordance with the upper layer mapping communication protocol. The transport layer management circuitry 206 may also process and reassemble inbound frames or packets as specified by the upper layer mapping communication protocol. The transport layer management circuitry 206 may also need to communicate with other transport layer circuitry for wide port management if the protocol is supported. Furthermore, the transport layer circuitry 206 may perform data transfer command processing.

The transport layer management circuitry 206 may include wide port interface manager circuitry 802A and an associated wide port transport layer task controller group 804A. The wide port transport layer controller group may include a plurality of transport layer (TL) task controllers 806A . . . 806N. The wide port interface management circuitry 802A may provide a communication control path for routing control, status, and/or data path information between the transport layer (TL) task controllers 806A . . . 806N and the associated port task scheduler.

The wide port transport layer task controller group 804A may include the maximum number of protocol engines that would be supported by the associated wide port. It may support one or more number of ports within the group. The transport layer (TL) task controllers 806A . . . 806N may be the transport layer engine that executes the task assigned by the port task scheduler as defined by the upper layer mapping protocol. The wide port transport layer task controller group 804A may also support transport layer retry circuitry (not illustrated) as supported by a particular communication protocol. The transport layer retry circuitry may perform retry functions as defined by the particular communication protocol, e.g., SAS, and may also keep track of context snapshot to be used during the retry. The wide port transport layer task controller group 804A may also support credit (transmit and receive) manager circuitry (not illustrated). The credit manager circuitry may manage credit for both inbound and outbound channels at each transport layer task controller.

The backend direct memory access (DMA) controller 808 may move data on and off the IC to or from memory. For a highly pipelined architecture, the task being processed on a link may be different than a task being processed at the backend. Therefore, the backend DMA controller 808 may process data movement between transmit and receive frame buffer to the backend interface. The DMA controller 808 may manage a portion of the context and communicate with the front end transport layer task controller.

The data domain translation manager 810 may translate logical block addressing (LBA) information between domains automatically without firmware/driver intervention from the host system 107. The data domain translation manager 810 enables the protocol engine circuitry 144 to support different RAID levels and volume virtualization, e.g., logical unit number (LUN) virtualization or LBA block level virtualization.

Figure 9:
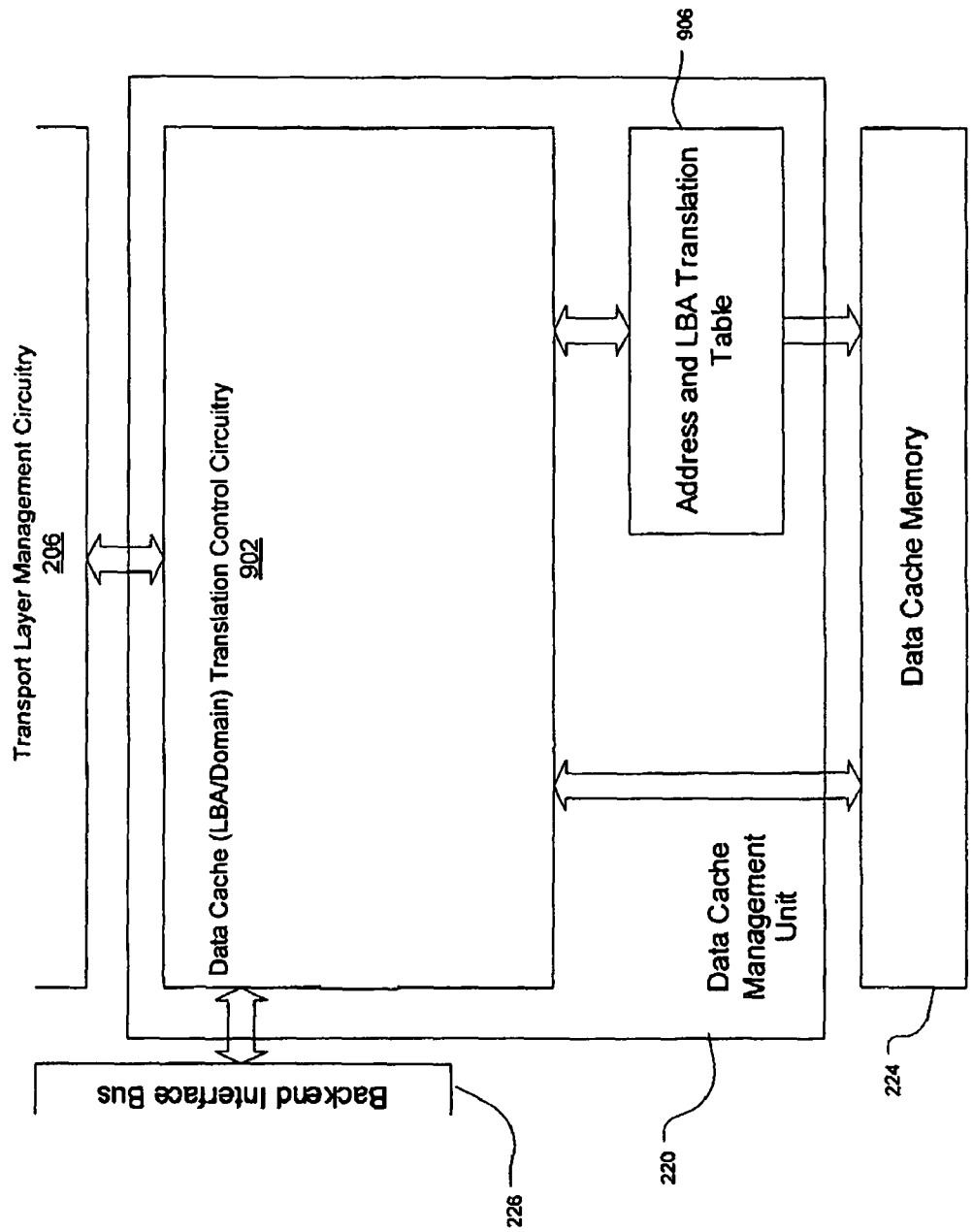
FIG. 9 is a diagram illustrating in greater detail data cache management circuitry in the integrated circuit of FIG. 2.

FIG. 9 illustrates in greater detail the data cache management unit 220 of FIG. 2. The data cache management unit 220 may include data cache (LBA/Domain) translation control circuitry 902 and an address and logical block addressing (LBA) translation table 906. In general, the data cache management unit 220 supports data caching to improve data transfer performance. The data cache management unit 220 may translate LBA values to cache memory addresses for the associated LBA data. The data cache translation control circuitry 902 may perform LBA to data cache buffer address translation control. The table 906 may be a memory locale to store LBA and address mapping information.

Figure 10:
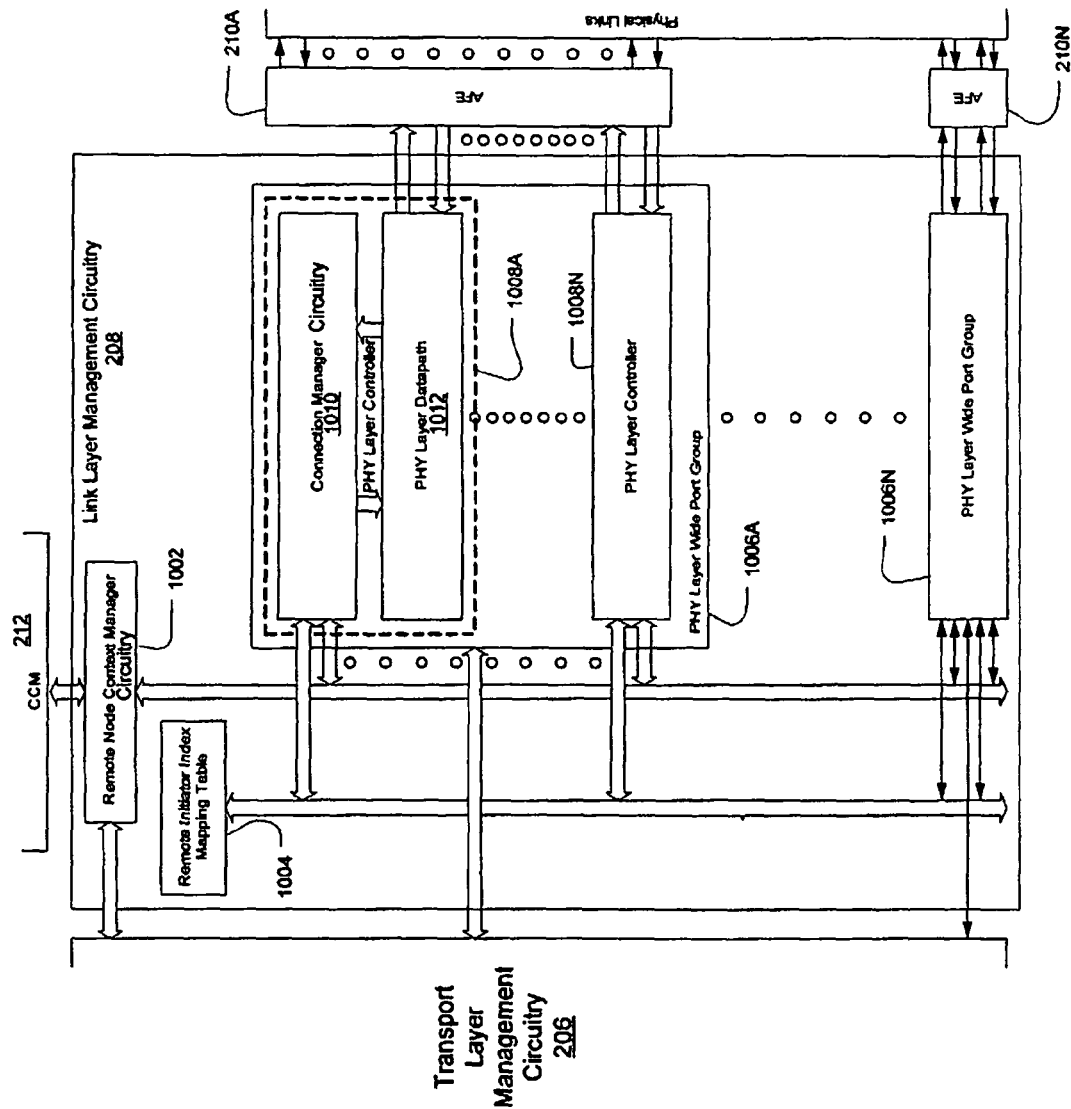
FIG. 10 is a diagram illustrating in greater detail link layer management circuitry of the protocol engine circuitry in the integrated circuit of FIG. 2.

FIG. 10 illustrates in greater detail link layer management circuitry 208 of the protocol engine circuitry 144 of the integrated circuit 140 of FIG. 2. The data link layer management circuitry 208 may include remote node context manager circuitry 1002, a remote initiator index mapping table 1004, a plurality of PHY layer wide port groups 1006A . . . 1006N, and associated analog front end (AFE) circuitry 210A . . . 210N. The remote node context manager circuitry 1002 may manage access to remote node context during connection request and connection arbitration. The remote node context manager circuitry 1002 may also manage remote node context updates.

The remote initiator index mapping table 1004 may include for mapping of the initiator address to local context index used to address to remote node context. Other implementations may not utilize the remote initiator index mapping table 1004 since they may not require initiator index translation, e.g., FCAL address.

The PHY layer wide port group 1006A may include a plurality of PHY layer controllers as required by the wide port transport layer task controller group. The PHY layer wide port group 1006A may include connection manager circuitry 1010 and a PHY layer data path 1012. The connection manager 1010 may establish connection to the appropriate remote node as requested by the transport layer management circuitry 206. The connection manager circuitry 1010 may manage automatic termination connection in response to communication protocol requirements such as link idle timeouts as specified by the SCSI mode page. The connection manager circuitry 1010 may also arbitrate between inbound or outbound connection requests as defined by the applicable communication protocol such as SAS. The connection manager circuitry 1010 may also mange connection request retries if a connection request failed in some communication protocol such as SAS.

The PHY layer data path 1012 may provide basic functions to perform low level link layer functions as required by most serial protocol interfaces. The PHY layer data path 1012 may also include automated link initialization such as loop initialization, speed negotiation in FCAL, etc. The analog front end circuitry 210A ... 210N may provide the physical link interface to the communication link(s). The analog front end circuitry may also include detection logic to automatically identify and select supported communication protocols such as, for example, SAS, SATA, and FC.

Figure 11:
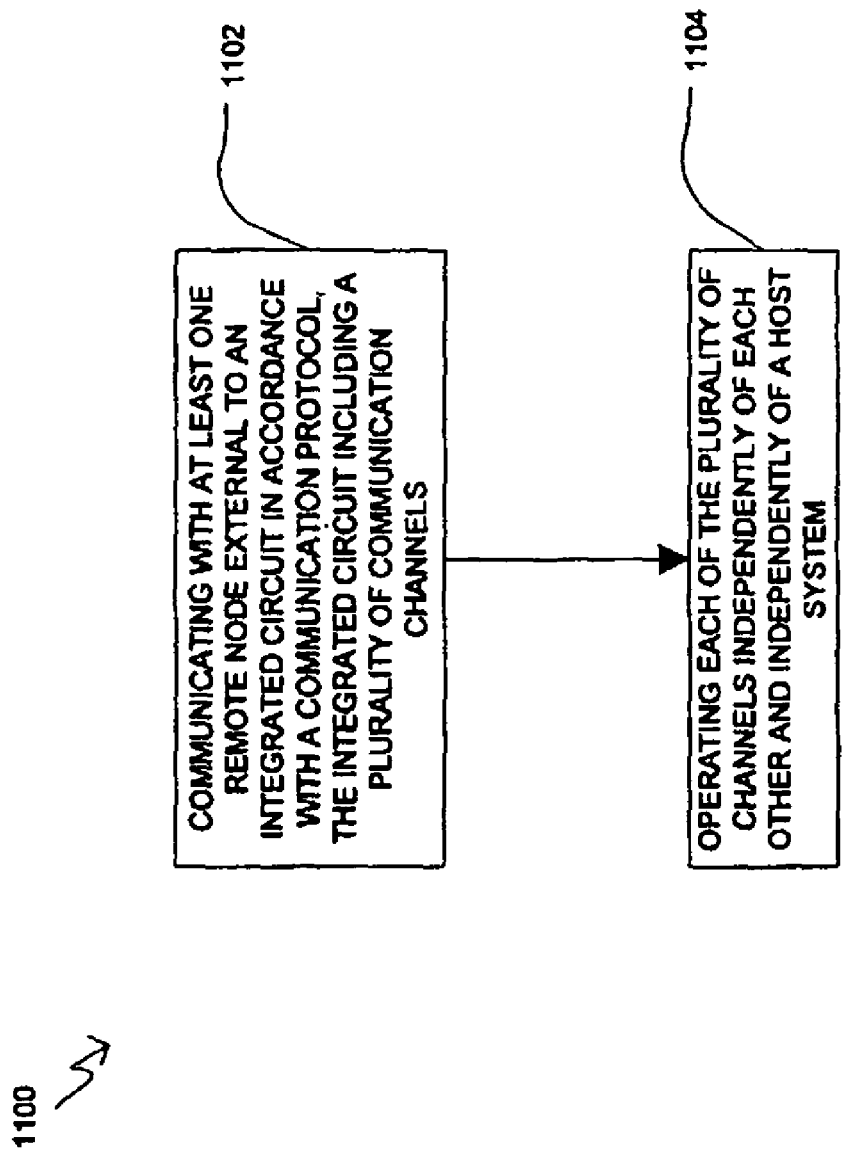
FIG. 11 is a flowchart illustrating operations that may be performed according to one embodiment.

FIG. 11 is a flow chart 1100 of operations according to an embodiment. Operation 1102 may include communicating with at least one remote node external to an integrated circuit in accordance with a communication protocol, the integrated circuit comprising a plurality of communication channels. Operation 1104 may include operating each of the plurality of communication channels independently of each other and independently of a host system.

In summary, in one embodiment there is provided an apparatus comprising an integrated circuit. An apparatus according to one embodiment may include an integrated circuit. The integrated circuit may include a plurality communication channels. The integrated circuit may be is capable of communicating with at least one remote node external to the integrated circuit, via at least one of the communication channels, in accordance with at least one communication protocol. Each of said plurality of communication channels may provide a communication path between a host system and at least one remote node. The integrated circuit may be further capable of operating each communication channel independently of each other and independently of the host system.

One system embodiment may comprise a circuit card comprising an integrated circuit. The circuit card may be capable of being coupled to a bus of a host system. The integrated circuit may include a plurality communication channels. The integrated circuit may be capable of communicating with at least one remote node external to the integrated circuit, via at least one of the communication channels, in accordance with at least one communication protocol. Each of said plurality of communication channels may provide a communication path between a host system and at least one remote node. The integrated circuit may be further capable of operating each communication channel independently of each other and independently of the host system.

Advantageously, in these embodiments the integrated circuit may offer enhanced communication capabilities. Any degradation on one communication channel such as difficulty in executing tasks for one communication channel may not adversely affect executing tasks for the remainder of communication channels. Furthermore, the integrated circuit may operate independently of the host system, which may further enhance communication speeds. The integrated circuit may also be able execute one of a plurality of task for one of the plurality of communication channels while simultaneously executing another one of the plurality of tasks for another one of the plurality of communication channels to further accelerate communication speed.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
   integrated circuitry comprising a plurality communication channels, said integrated circuitry is capable of communicating with at least one remote node external to the integrated circuitry, via at least one of said communication channels, in accordance with at least one communication protocol, each of said plurality of communication channels providing a communication path between a host system and at least one said remote node, the integrated circuitry is further capable of operating each said communication channel independently of each other and independently of said host system;
   wherein the integrated circuitry further comprises:
      a task management circuit capable of receiving a plurality of tasks from said host system, said task management circuit further capable of scheduling said plurality of tasks independently of said host system and said task management circuit further capable of selecting tasks independently of said host system; and
      a respective protocol engine circuit associated with each channel and capable of executing selected tasks independently of said host system and said protocol engine circuit further capable of reporting a result of an executed task to said task management circuit;
      wherein said task management circuit and protocol engine circuits are implemented in hardware circuitry, without firmware or software; and
      wherein each said protocol engine circuit is further capable of executing one of said plurality of tasks for one of said plurality of communication channels while another one of said protocol engine circuits is simultaneously executing another one of said plurality of tasks for another one of said plurality of communication channels.

2. The apparatus of claim 1, wherein if a failure and/or error condition exists in one of said plurality of communication channels, the integrated circuitry is capable of operating a remainder of said plurality of communication channels.

3. The apparatus of claim 1, wherein the at least one communication protocol comprises a Serial Attached Small Computer Systems Interface (SAS) protocol.

4. A system comprising:
   a circuit card comprising integrated circuitry, the circuit card being capable of being coupled to a bus of a host system, the integrated circuitry comprising a plurality communication channels, said integrated circuitry is capable of communicating with at least one remote node external to the integrated circuitry, via at least one of said communication channels, in accordance with at least one communication protocol, each of said plurality of communication channels providing a communication path between a host system and at least one said remote node, the integrated circuitry is further capable of operating each said communication channel independently of each other and independently of said host system;

wherein the integrated circuitry further comprises:

a task management circuit capable of receiving a plurality of tasks from said host system, said task management circuit further capable of scheduling said plurality of tasks independently of said host system and said task management circuit further capable of selecting tasks independently of said host system; and a respective protocol engine circuit associated with each channel and capable of executing selected tasks independently of said host system and said protocol engine circuit further capable of reporting a result of an executed task to said task management circuit;

wherein said task management circuit and protocol engine circuits are implemented in hardware circuitry, without firmware or software; and wherein each said protocol engine circuit is further capable of executing one of said plurality of tasks for one of said plurality of communication channels while another one of said protocol engine circuits is simultaneously executing another one of said plurality of tasks for another one of said plurality of communication channels.

5. The system of claim 4, further comprising a circuit board comprising the bus and a bus interface slot, the circuit card being capable of being coupled to the bus interface slot.

6. The system of claim 4, wherein said at least one remote node comprises a mass storage array.

7. The system of claim 6, wherein said mass storage device comprises a redundant array of independent disks (RAID).

8. A method comprising:

communicating with at least one remote node, via integrated circuitry comprising a plurality of communication channels, in accordance with at least one communication protocol, each of said plurality of communication channels providing a communication path between a host system and at least one said remote node; and operating each said communication channel independently of each other and independently of said host system;

wherein said integrated circuitry further comprises a task management circuit and a respective protocol engine circuit associated with each channel, and said communicating and operating further comprise:

receiving, via said task management circuit, a plurality of tasks from said host system;

scheduling, via said task management circuit, said plurality of tasks independently of said host system;

selecting, via said task management circuit, tasks independently of said host system;

executing, via a respective one of said protocol engine circuits, selected tasks independently of said host system; and reporting, via said respective one of said protocol engine circuits, a result of an executed task to said task management circuit;

wherein said task management circuit and protocol engine circuits are implemented in hardware circuitry, without firmware or software; and wherein each said protocol engine circuit is further capable of executing one of said plurality of tasks for one of said plurality of communication channels while another one of said protocol engine circuits is simultaneously executing another one of said plurality of tasks for another one of said plurality of communication channels.

9. The method of claim 8, wherein if one of said plurality of communication channels suffers a failure, the integrated circuitry is capable of operating a remainder of said plurality of communication channels.

10. The method of claim 8, wherein the communication protocol comprises a Serial Attached Small Computer Systems Interface (SAS) protocol.

11. An apparatus, comprising:

first circuit for receiving a plurality of tasks from a host system, scheduling said plurality of tasks independently of said host system, and selecting tasks independently of said host system; and second circuit comprising a plurality of communication channels, each of said communication channels including a respective protocol engine circuit capable of executing selected tasks for that communication channel and independently of said host system, said second circuit is capable of operating each said communication channel independently of each other and independently of said host system;

wherein said first and second circuits are implemented in hardware circuitry, without firmware or software; and wherein each said protocol engine circuit is further capable of executing one of said plurality of tasks for one of said plurality of communication channels while another one of said protocol engine circuits is simultaneously executing another one of said plurality of tasks for another one of said plurality of communication channels.

12. The apparatus of claim 11, wherein if one of said plurality of communication channels suffers a failure, the apparatus is capable of operating a remainder of said plurality of communication channels.

13. The apparatus of claim 1, wherein the integrated circuitry is a single integrated circuit chip.

14. The apparatus of claim 1, wherein said task management circuit and protocol engine circuits are implemented as a single integrated circuit chip.

15. The system of claim 4, wherein the integrated circuitry is a single integrated circuit chip.

16. The method of claim 8, wherein the integrated circuitry is a single integrated circuit chip.

17. The apparatus of claim 11, wherein the apparatus is a single integrated circuit chip.

* * * * *